(12) United States Patent
Jo et al.

(10) Patent No.: US 12,517,485 B2
(45) Date of Patent: Jan. 6, 2026

(54) BATTERY MANUFACTURING METHOD AND BATTERY MANUFACTURING SYSTEM

(71) Applicant: LG Energy Solution, Ltd., Seoul (KR)

(72) Inventors: Eun Ji Jo, Daejeon (KR); Min Su Kim, Daejeon (KR); Wi Dae Park, Daejeon (KR); Jong Seok Park, Daejeon (KR); Dong Min Seo, Daejeon (KR); Seol Hee Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/711,800

(22) PCT Filed: Sep. 6, 2023

(86) PCT No.: PCT/KR2023/013366
§ 371 (c)(1),
(2) Date: May 20, 2024

(87) PCT Pub. No.: WO2024/090776
PCT Pub. Date: May 2, 2024

(65) Prior Publication Data
US 2024/0419142 A1 Dec. 19, 2024

(30) Foreign Application Priority Data

Oct. 26, 2022 (KR) .................. 10-2022-0139553
Aug. 28, 2023 (KR) .................. 10-2023-0112586

(51) Int. Cl.
*G05B 19/042* (2006.01)
*H01M 10/04* (2006.01)

(52) U.S. Cl.
CPC ........... *G05B 19/0426* (2013.01); *G05B 2219/25129* (2013.01); *H01M 10/0404* (2013.01)

(58) Field of Classification Search
CPC ............. G05B 19/0426; G05B 19/418; G05B 2219/25129; G05B 2219/31001;
(Continued)

(56) References Cited

U.S. PATENT DOCUMENTS 7,497,370 B2 * 3/2009 Allen ................ G06Q 10/0875
235/375
7,695,852 B2 4/2010 Haraguchi et al.
(Continued)

FOREIGN PATENT DOCUMENTS

CN 107611486 A 1/2018
CN 113656352 A * 11/2021 ........... G06F 16/162
(Continued)

OTHER PUBLICATIONS

CN 113656352 A, publ. Nov. 16, 2021 (machine translation).*
CN 113762985 A, publ. Dec. 7, 2021 (machine translation).*

*Primary Examiner* — Alicia M. Choi
(74) *Attorney, Agent, or Firm* — Bryan Cave Leighton Paisner LLP (57) ABSTRACT

A battery manufacturing method according to the present disclosure includes generating a virtual identifier (ID) corresponding to a battery cell, shifting the virtual ID according to a progression of processes included in a process line for the battery cell, storing the shifted virtual ID and associating the shifted virtual ID with process data generated for the battery cell, extracting a cell ID for the battery cell, and matching the process data associated with the shifted virtual ID with the cell ID, and transmitting the process data to an upper control system.

17 Claims, 5 Drawing Sheets

(58) Field of Classification Search
CPC .. H01M 10/0404; H01M 10/04; H01M 10/42; H01M 10/425; G06Q 10/06395; G06Q 50/04; G06Q 50/06; G01R 31/392; G01R 31/367

See application file for complete search history.

(56) References Cited

U.S. PATENT DOCUMENTS

| | | | | |
|---|---|---|---|---|
| 10,019,764 | B2* | 7/2018 | Sugiyama | G06Q 50/04 |
| 10,895,859 | B2* | 1/2021 | Weatherhead | G06Q 50/04 |
| 10,997,551 | B2* | 5/2021 | Kikinis | G06Q 20/02 |
| 11,014,123 | B2* | 5/2021 | Issac | B65G 15/06 |
| 11,035,905 | B1* | 6/2021 | Nam | G01R 31/389 |
| 11,989,226 | B2* | 5/2024 | Murata | G06Q 50/04 |
| 12,040,461 | B2* | 7/2024 | Huemiller | G01B 7/085 |
| 12,055,592 | B2* | 8/2024 | Huh | G01R 31/389 |
| 2012/0222990 | A1* | 9/2012 | Fujiwara | G06K 19/06046 |
| | | | | 206/703 |
| 2015/0249258 | A1* | 9/2015 | Wolf | H01M 10/0404 |
| | | | | 29/730 |
| 2020/0401117 | A1* | 12/2020 | Tatedoko | G06Q 10/06395 |
| 2022/0414143 | A1* | 12/2022 | Murata | G06T 7/00 |
| 2023/0045756 | A1* | 2/2023 | Hung | H04L 9/3239 |
| 2024/0097218 | A1* | 3/2024 | Sim | H01M 4/0404 |
| 2024/0103487 | A1* | 3/2024 | Hwang | G05B 19/4097 |
| 2024/0204273 | A1* | 6/2024 | Jones | G01R 31/386 |
| 2024/0222592 | A1* | 7/2024 | Chen | H01M 10/0587 |
| 2024/0419142 | A1* | 12/2024 | Jo | G06Q 50/04 |

FOREIGN PATENT DOCUMENTS

| | | | | |
|---|---|---|---|---|
| CN | 113762985 A | * 12/2021 | ......... | G06K 17/0029 |
| JP | 2013-030376 A | 2/2013 | | |
| JP | 2021-086193 A | 6/2021 | | |
| KR | 10-0601562 B1 | 7/2006 | | |
| KR | 10-2016-0061756 A | 6/2016 | | |
| KR | 10-2018-0049734 A | 5/2018 | | |
| KR | 10-2029776 B1 | 10/2019 | | |
| KR | 10-2020-0028618 A | 3/2020 | | |
| KR | 10-2020-0099364 A | 8/2020 | | |
| KR | 10-2021-0058206 A | 5/2021 | | |
| KR | 10-2022-0039264 A | 3/2022 | | |
| WO | 2011/152273 A1 | 7/2013 | | |
| WO | WO-2022065717 A1 | * 3/2022 | ............ | H01M 10/04 |

* cited by examiner

BATTERY MANUFACTURING METHOD AND BATTERY MANUFACTURING SYSTEM

CROSS-REFERENCE TO RELATED APPLICATION

This application is a National Phase entry pursuant to 35 U.S.C. 371 of International Application No. PCT/KR2023/013366 filed on Sep. 6, 2023, which claims priority to, and the benefit of, Korean Patent Application No. 10-2022-0139553 filed on Oct. 26, 2022 in the Korean Intellectual Property Office and Korean Patent Application No. 10-2023-0112586 filed on Aug. 28, 2023 in the Korean Intellectual Property Office. The contents of the above-identified applications are herein incorporated by reference in their entireties.

TECHNICAL FIELD

Embodiments set forth herein relate to a battery manufacturing method of producing a battery for storing power and a battery manufacturing system therefor.

BACKGROUND

Recently, research and development on secondary batteries have been actively performed. Secondary batteries are rechargeable/dischargeable batteries and may include conventional Ni/Cd batteries, Ni/MH batteries, etc., and lithium-ion batteries that have recently been used. Lithium-ion batteries have much higher energy density than conventional Ni/Cd batteries, Ni/MH batteries, and the like. In addition, lithium-ion batteries may be manufactured in lightweight and small sizes and thus are used as power sources for mobile devices. Recently, lithium-ion batteries have drawn attention as next-generation energy storage media as a range of use thereof has extended to power sources of electric vehicles.

Manufacturing processes of a battery are performed in a time-series manner according to a predetermined process order, and process data collected corresponding to the battery in each of the processes may be reported in a time-series manner to an upper controller. The upper controller may analyze the reported process data to predict the quality of the battery or analyze a cause of quality degradation. For the accuracy of the analysis, matching between the battery and the process data should be guaranteed.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

SUMMARY

Embodiments set forth herein are directed to providing a battery manufacturing method and a battery manufacturing system for ensuring matching between process data reported to an upper controller and a battery.

Technical aspects of the embodiments set forth herein are not limited thereto, and other technical aspects that are not described herein will be clearly understood by those of ordinary skill in the art from the following description.

A battery manufacturing method according to an embodiment of the present disclosure includes generating a virtual identifier (ID) corresponding to a battery cell, shifting the virtual ID according to a progression of processes included in a process line for the battery cell, storing the shifted virtual ID and associating the shifted virtual ID with process data generated for the battery cell, extracting a cell ID for the battery cell, and matching the process data associated with the shifted virtual ID with the cell ID, and transmitting the process data to an upper control system.

In an embodiment, the battery manufacturing method may further include matching the virtual ID with process step information indicating a current process of the process line being performed for the battery cell after the generating of the virtual ID.

In an embodiment, the shifting of the virtual ID may include changing the process step information matching the virtual ID when the current process being performed for the battery cell is changed.

In an embodiment, the process data may include a work result and/or a test result of at least one process included in the process line for the battery cell.

In an embodiment, the extracting of the cell ID for the battery cell may include reading a cell ID that is in a form of barcode attached to the battery cell.

In an embodiment, the process data matching the cell ID may include process data collected in a time-series manner throughout the progression of processes in the process line for the battery cell.

In an embodiment, the process line for the battery cell may include a notching and dryer (NDD) process and/or a lamination process.

A battery manufacturing system according to an embodiment of the present disclosure includes a virtual ID generator configured to generate a virtual ID corresponding to a battery cell, a virtual ID manager configured to shift the virtual ID according to a progression of processes included in a process line for the battery cell, a process data collector configured to configured to store the shifted virtual ID and associate the shifted virtual ID with process data generated for the battery cell, and a main control part configured to generate process information by matching the process data associated with the virtual ID with a cell ID extracted from the battery cell.

According to a battery manufacturing method and a battery manufacturing system according to an embodiment set forth herein, the reliability of a battery quality analysis can be increased through accurate matching between process data and a battery.

In addition, various effects directly or indirectly identified through the present disclosure can be achieved.

BRIEF DESCRIPTION OF THE DRAWINGS

The accompanying drawings illustrate preferred embodiments of the present disclosure and together with the foregoing disclosure, serve to provide further understanding of the technical features of the present disclosure, and thus, the present disclosure is not construed as being limited to the drawings.

DETAILED DESCRIPTION

A battery manufacturing method according to an embodiment of the present disclosure includes generating a virtual identifier (ID) corresponding to a battery cell, shifting the virtual ID according to a progression of processes included in a process line for the battery cell, storing the shifted virtual ID and associating the shifted virtual ID with process data generated for the battery cell, extracting a cell ID for the battery cell, and matching the process data associated with the shifted virtual ID with the cell ID, and transmitting the process data to an upper control system.

A battery manufacturing system according to an embodiment of the present disclosure includes a virtual ID generator configured to generate a virtual ID corresponding to a battery cell, a virtual ID manager configured to shift the virtual ID according to a progression of processes included in a process line for the battery cell, a process data collector configured to store the shifted virtual ID and associate the shifted virtual ID with process data generated for the battery cell, and a main control part configured to generate process information by matching the process data associated with the virtual ID with a cell ID extracted from the battery cell.

Hereinafter, embodiments set forth herein will be described in detail with reference to exemplary drawings. It should be noted that the same reference numerals are assigned to the same components even in different drawings when reference numerals are assigned to components in each drawing. A description of well-known constructions or functions will not be described in detail when it is determined that the description would obscure the understanding of the embodiments of the present disclosure set forth herein in describing the embodiments.

Terms such as first, second, A, B, (a), and (b) may be used to describe components of the embodiments of the present disclosure. Such a term is only for distinguishing one component from another, and the essence of the component, an order or a sequence is not limited by the term. Unless otherwise defined, all terms used here, including technical or scientific terms, have the same meaning as those generally understood by those with ordinary knowledge in the technical field to which the embodiments disclosed herein belong. Terms such as those defined in commonly used dictionaries should be interpreted as having a meaning consistent with the contextual meaning of the relevant technology and are not interpreted as ideal or excessively formal unless explicitly defined in this application.

Figure 1:
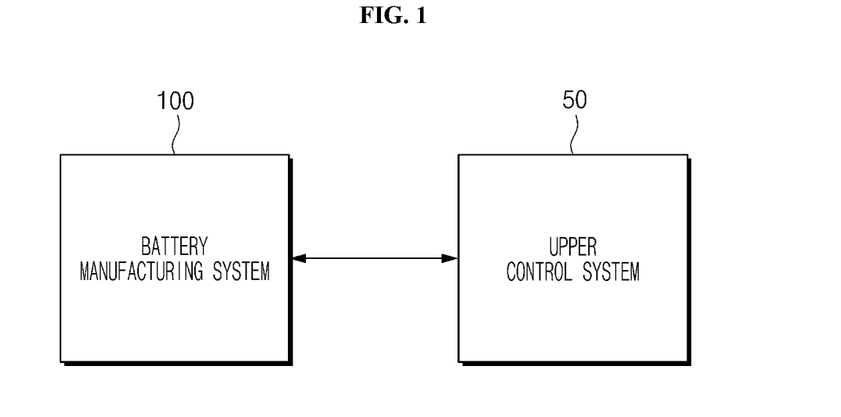
FIG. 1 is a block diagram of a battery manufacturing system and an upper control system according to an embodiment disclosed in the present disclosure.

FIG. 1 is a block diagram of a battery manufacturing system and an upper control system according to an embodiment disclosed in the present disclosure.

FIG. 1 illustrates a battery manufacturing system 100 and an upper control system 50.

The battery manufacturing system 100 may be a process system for manufacturing a battery capable of storing power. For example, a battery may be manufactured in the form of a battery pack, and the battery pack may be manufactured through an electrode process of forming a positive electrode and a negative electrode of a battery, an assembly process of stacking electrode plates according to a battery shape (e.g., a cylindrical shape, a prismatic shape, or a pouch shape), injecting an electrolyte, and a sealing a resultant structure, an activation process of activating an assembled battery using electrical energy, and a pack process of modularizing battery cells in units of packs. In the present disclosure, it is assumed that the battery manufacturing system 100 is a process system that performs a Notching AND Drier (NND) process and/or a lamination process during the assembly process but the scope of the present disclosure is not limited thereto.

The upper control system 50 may receive process data, for monitoring a battery manufacturing process performed by the battery manufacturing system 100, reported from the battery manufacturing system 100, and analyze a cause of deterioration of battery quality on the basis of the process data. To this end, the upper control system 50 may communicate with the battery manufacturing system 100 to transmit and receive data. Here, the process data may include a work result and/or a test result related to a battery in each of processes performed by the battery manufacturing system 100. According to an embodiment, the upper control system 50 may include an edge computer system (ECS) system and/or an equipment data collection (EDC) system.

Figure 2:
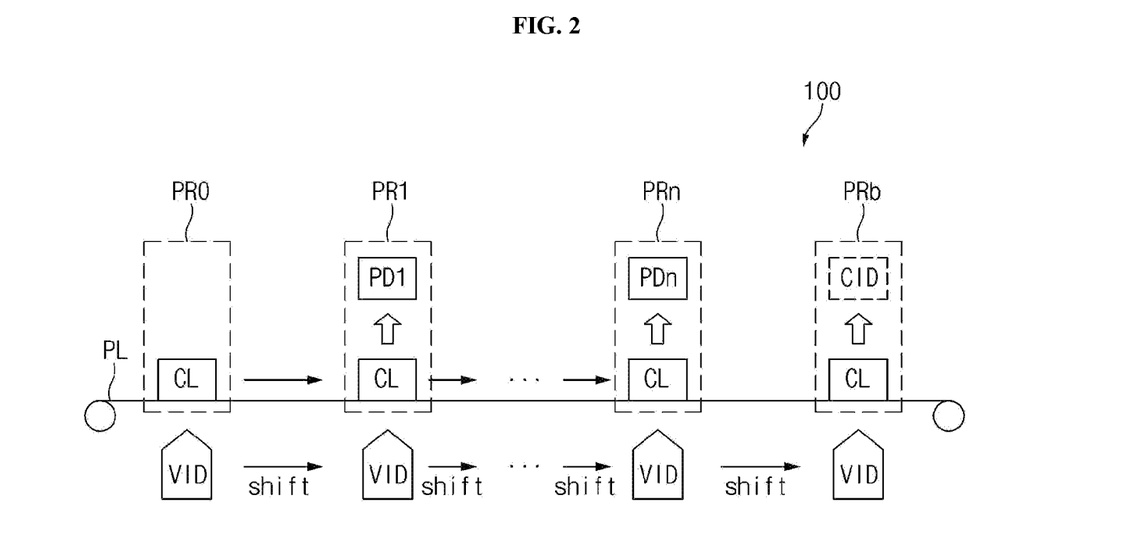
FIG. 2 is a schematic diagram illustrating an order of processes performed by the battery manufacturing system of FIG. 1.
Figure 3:
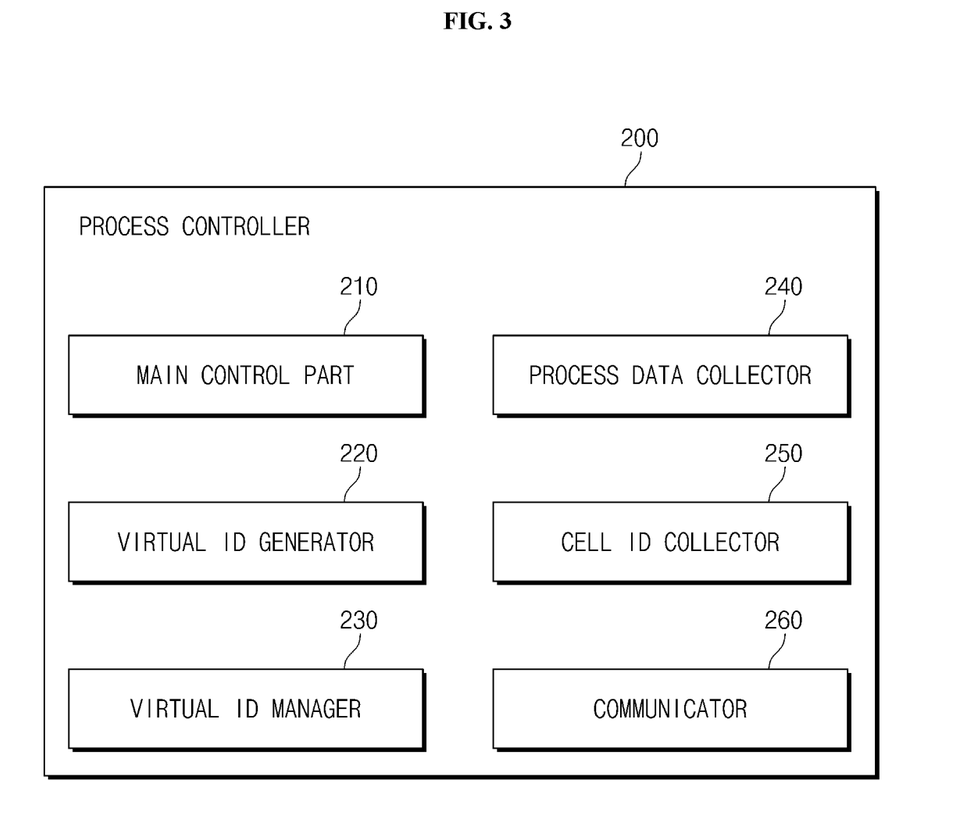
FIG. 3 is a block diagram illustrating a configuration of a process controller for controlling the battery manufacturing system of FIG. 1.
Figure 4:
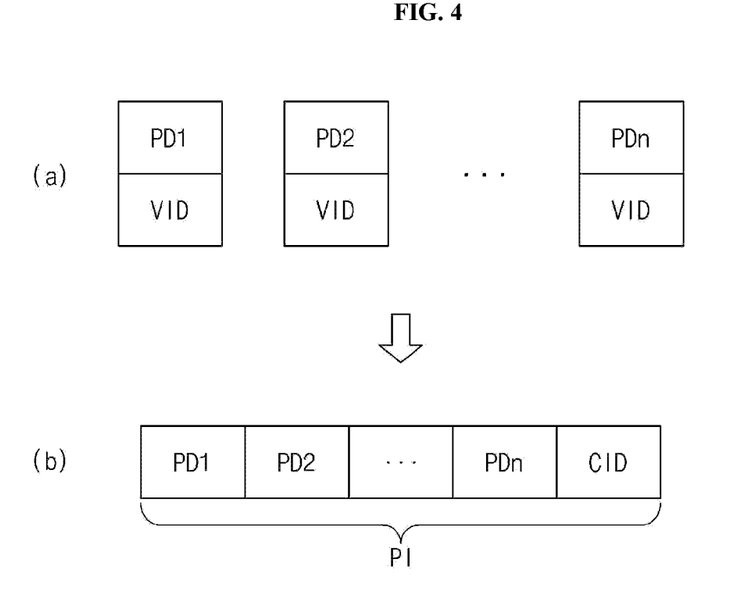
FIG. 4 is a diagram for describing a method of processing process data collected in the battery manufacturing system of FIG. 1.

FIG. 2 is a schematic diagram illustrating an order of processes performed by the battery manufacturing system of FIG. 1. FIG. 3 is a block diagram illustrating a configuration of a process controller for controlling the battery manufacturing system of FIG. 1. FIG. 4 is a diagram for describing a method of processing process data collected in the battery manufacturing system of FIG. 1.

Referring to FIGS. 2 to 4, FIG. 2 schematically illustrates an order of processes performed by the battery manufacturing system 100, and FIG. 3 illustrates a configuration of a process controller 200 for controlling processes performed by the battery manufacturing system 100. The process controller 200 may be included in the battery manufacturing system 100, but the scope of the present disclosure is not limited thereto and at least a part of the process controller 200 may be located outside the battery manufacturing system 100.

The process controller 200 may include a main control part 210, a virtual identifier (ID) generator 220, a virtual ID manager 230, a process data collector 240, a cell ID collector 250, and a communicator 260. According to an embodiment, the process controller 200 may be a programmable logical controller (PLC).

The main control part 210 may control overall operations of the process controller 200, and in particular, may control an overall process flow, such as an order of processes and a current state, of each battery cell CL. Unless otherwise mentioned in the following description, an operation of the process controller 200 may be an operation performed by the main control part 210. Operations of the remaining components of the process controller 200 will be described with reference to FIG. 2 below.

As illustrated in FIG. 2, the battery manufacturing system 100 may include a process line PL, and processes may be sequentially performed on the process line PL. That is, when a battery cell CL is put into the process line PL, first to $n^{th}$ processes PR1 to PRn (n is an integer greater than or equal to 2) may be sequentially performed starting from a start process PR0, and a barcode process PRb may be performed as a finish process. The battery cell CL may be in a form in which electrodes, a separator, and an electrolyte are completely assembled together in a specific shape (a cylindrical shape, a prismatic shape, a pouch shape or the like) or be in a state in which only some components (e.g., the electrodes and the separator) are included before the components are completely assembled together, but in the present disclosure, the battery cell CL will be described as including a state before the components are completely assembled together.

In the start process PR0, a process (e.g., cleaning) for preparing the first to $n^{th}$ processes PR1 to PRn may be performed on the battery cell CL, and the virtual ID generator 220 may generate a virtual ID VID corresponding to the battery cell CL. The virtual ID VID is information for identifying the battery cell CL and may be generated using, for example, time when the battery cell CL has been put into the process line PL but the scope of the present disclosure is not limited thereto. The virtual ID generator 220 may provide the virtual ID manager 230 with the virtual ID VID generated corresponding to the battery cell CL. The virtual ID manager 230 may store a first received virtual ID VID to be matched with process step information indicating the start process PR0. The process step information may be information indicating a process currently being performed on the battery cell CL corresponding to the virtual ID VID among all processes.

When the start process PR0 is completed, the battery cell CL may be moved for the first process PR1, and the virtual ID manager 230 may shift the virtual ID VID of the battery cell CL to the first process PR1 in synchronization with the movement of the battery cell CL. Here, shifting may be understood as replacing the process step information of the start process PR0 matching the virtual ID VID with process step information of the first process PR1 and storing the replaced process step information. That is, the purpose of shifting is to match the process step information corresponding to the virtual ID VID of the battery cell CL with a process being performed on the battery cell CL.

Process equipment (not shown) performing the first process PR1 may generate process data PD1 including a work result and/or a test result for the battery cell CL while the first process PR1 is performed, and the process data collector 240 may store the process data PD1 received from the process equipment performing the first process PR1 to be matched with the virtual ID VID on the basis of information stored in the virtual ID manager 230. That is, upon receiving the process data PD1 from the process equipment performing the first process PR1, the process data collector 240 may receive the virtual ID VID matching the process step information of the first process PR1 from the virtual ID manager 230 and store the virtual ID VID and the process data PD1 to match each other.

When the first process PR1 is completed, the battery cell CL may be moved for the second process PR2, and the virtual ID manager 230 may shift the virtual ID VID of the battery cell CL to the second process PR2 in synchronization with the movement of the battery cell CL.

Thereafter, process equipment (not shown) performing the second process PR2 may generate process data PD2 including a work result and/or a test result for the battery cell CL while the second process PR2 is performed, and the process data collector 240 may store the process data PD2 received from the process equipment performing the second process PR2 to be matched with the virtual ID VID on the basis of the information stored in the virtual ID manager 230. That is, upon receiving the process data PD2 from the process equipment performing the second process PR2, the process data collector 240 may receive the virtual ID VID matching the process step information of the second process PR2 from the virtual ID manager 230 and store the virtual ID VID and the process data PD2 to match each other.

That is, a shift operation of the virtual ID manager 230 and a process data storing operation of the process data collector 240 may be sequentially performed for each of the first to $n^{th}$ processes PR1 to PRn until the $n^{th}$ process PRn is completed.

As shown in FIG. 4A, when the $n^{th}$ process PRn is completed, the process data PD1 to PDn for the battery cell CL may be stored in the process data collector 240 to be matched with the virtual ID VID.

When the $n^{th}$ process PRn is completed, the battery cell CL may be moved for the barcode process PRb, and the virtual ID manager 230 may shift the virtual ID VID of the battery cell CL to the barcode process PRb in synchronization with the movement of the battery cell CL.

In the barcode process PRb, a process (e.g., cleaning) for finishing the battery cell CL may be performed, and a barcode reader (not shown) may read a cell ID CID that is in the form of a barcode attached to the battery cell CL. In the present disclosure, the cell ID CID is described as being attached in the form of a barcode to the battery cell CL, but the scope of the present disclosure is not limited thereto and may be attached to the battery cell CL in another form (e.g., a quick response (QR) code, ID number or the like), and in this case, the barcode reader may be replaced with a device capable of reading the cell ID (CID) that is in the other form.

Meanwhile, the cell ID CID that is in the form of barcode may be attached to the battery cell CL when one of the first to $n^{th}$ processes PR1 to PRn is performed. Here, the cell ID CID that is in the form of barcode may be attached directly to the battery cell CL or to a device carrying the battery cell CL in another embodiment.

A barcode reader (not shown) may read the cell ID CID that is in the form of barcode attached to the battery cell CL to extract the cell ID CID, and transmit the extracted cell ID CID to the cell ID collector 250.

Upon receiving the cell ID CID, the cell ID collector 250 may extract the virtual ID VID matching the process step information of the barcode process PRb on the basis of the information stored in the virtual ID manager 230, and transmit the extracted virtual ID and cell ID CID to the main control part 210.

Upon receiving the virtual ID VID and the cell ID CID from the cell ID collector 250, the main control part 210 may receive the process data PD1 to PDn for the battery cell CL matching the virtual ID VID from the process data collector 240 and generate process information PI for the battery cell CL by matching the process data PD1 to PDn for the battery cell CL and the cell ID CID.

That is, in FIG. 4A, the process data collector 240 may store the process data PD1 to PDn for the battery cell CL to be matched with the virtual ID VID, and the main control part 210 may receive the process data PD1 to PDn collected in a time series manner in the processes performed on the battery cell CL matching the virtual ID VID received together with the cell ID CID from the process data collector 240, and generate the process information PI for the battery cell CL by matching the process data PD1 to PDn for the battery cell CL and the cell ID CID as shown in FIG. 4B.

The communicator 260 may establish a wired communication channel and/or a wireless communication channel between the process controller 200 and the upper control system 50 and transmit and receive data to and from the upper control system 50 through the established communication channel. For example, the communicator 260 may transmit and receive data to and from other devices on the basis of at least one radio access technology (RAT). The communication unit 260 may transmit (or report) the process information PI including the process data PD1 to PDn for the battery cell CL and the cell ID CID to the upper control system 50.

According to the present disclosure, the process controller 200 may assign and manage the virtual ID VID to the battery cell CL, temporarily store the process data PD1 to PDn to be matched with the virtual ID VID whenever each process is completed, and generate the process data PI by extracting the process data PD1 to PDn corresponding to the battery cell CL according to the virtual ID VID matching the cell ID CID of the battery cell CL, thereby securing matching between the process data PD1 to PDn and the battery cell CL. The process information PI for which matching is secured may be transmitted to the upper control system 50, and the upper control system 50 may search for the process data PD1 to PDn that accurately matches the battery cell CL by referring to the cell ID CID, thereby increasing the accuracy of quality-related analysis for the battery cell CL.

A lot of time and resources may be required to preprocess the process data PD1 to PDn and matching between the data may decrease, when the upper control system 50 estimates the process data PD1 to PDn corresponding to the battery cell CL from time when each process has been completed after the process data PD1 to PDn is reported to the upper control system 50 in a time series manner without using the virtual ID VID.

Figure 5:
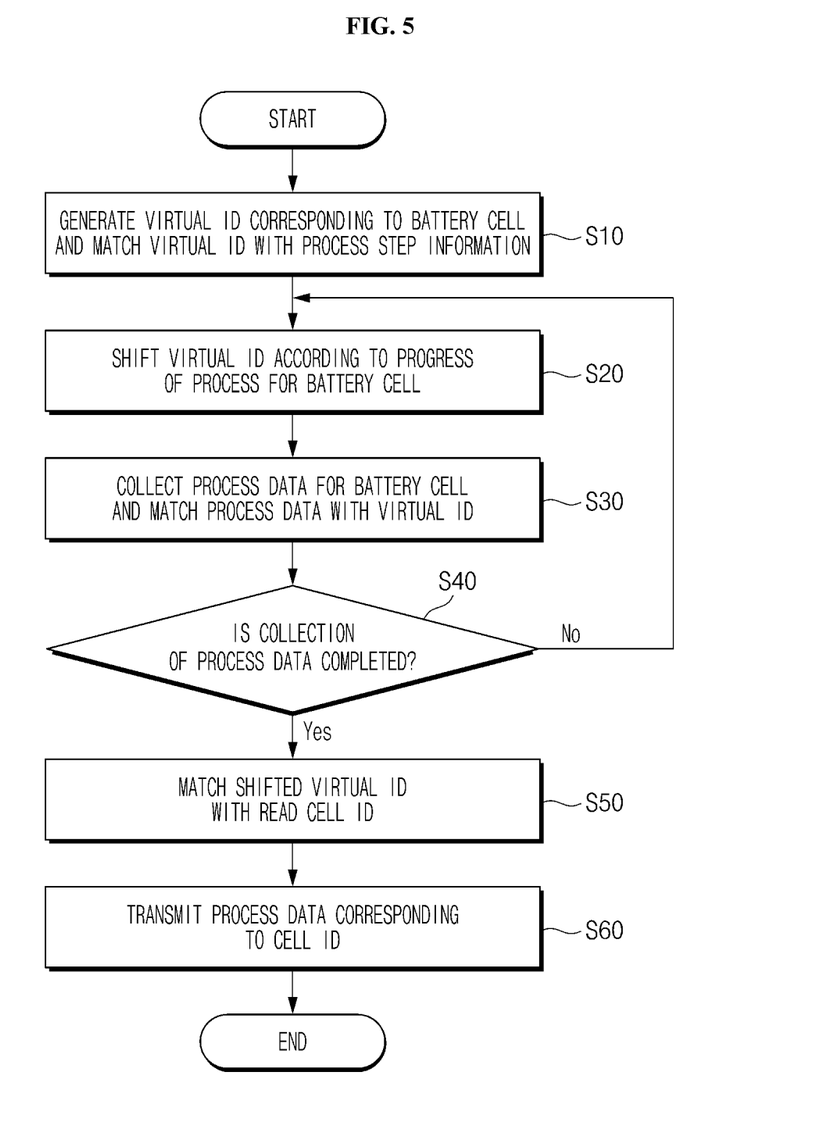
FIG. 5 is a flowchart of a battery manufacturing method according to an embodiment of the present disclosure.

FIG. 5 is a flowchart of a battery manufacturing method according to an embodiment of the present invention.

Referring to FIG. 5, in a start process PR0, the virtual ID generator 220 may generate a virtual ID VID corresponding to a battery cell CL. The virtual ID generator 220 may provide the virtual ID manager 230 with the virtual ID VID generated corresponding to the battery cell CL, and the virtual ID manager 230 may store a first received virtual ID VID to be matched with process step information of the start process PR0 (S10).

When the start process PR0 is completed, the battery cell CL may be moved for a first process PR1, and the virtual ID manager 230 may shift the virtual ID VID of the battery cell CL to the first process PR1 in synchronization with the movement of the battery cell CL. That is, the virtual ID manager 230 may set process step information such that the process step information matching the virtual ID VID of the battery cell CL may indicate a process being performed on the battery cell CL.

Process equipment (not shown) performing the first process PR1 may generate the process data PD1 for the battery cell CL while the first process PR1 is performed, and the process data collector 240 may store the process data PD1 received from the process equipment performing the first process PR1 to be matched with the virtual ID VID corresponding to process step information of the first process PR1 on the basis of information stored in the virtual ID manager 230 (S30).

Operations S20 and S30 may be repeatedly performed until an $n^{th}$ process PRn of completing the collection of process data is completed (No in S40).

When the $n^{th}$ process PRn of completing the collection of process data is completed (Yes in S40), the battery cell CL may be moved for a barcode process PRb, and the virtual ID manager 230 may also shift the virtual ID VID of the battery cell CL to the barcode process PRb in synchronization with the movement of the battery cell CL.

In the barcode process PRb, a barcode reader (not shown) may read a cell ID CID that is in the form of barcode attached to the battery cell CL to extract the cell ID CID, and transmit the extracted cell ID CID to the cell ID collector 250.

Upon receiving the cell ID CID, the cell ID collector 250 may extract the virtual ID VID matching process step information of the barcode process PRb on the basis of the information stored in the virtual ID manager 230, and transmit the extracted virtual ID and cell ID CID to the main control part 210 (S50).

Upon receiving the virtual ID VID and the cell ID CID from the cell ID collector 250, the main control part 210 may receive the process data PD1 to PDn for the battery cell CL matching the virtual ID VID from the process data collector 240, generate process information PI for the battery cell CL by matching the process data PD1 to PDn for the battery cell CL and the cell ID CID, and transmit the generated process data PI to the upper control system 50 (S60).

Although in the present disclosure, a battery manufacturing method has been described above with respect to one battery cell CL, the battery manufacturing system 100 is capable of simultaneously performing processes for a plurality of battery cells, and the battery manufacturing method described herein is applicable to each of the plurality of battery cells. In this case, the plurality of battery cells may be assigned different virtual IDs VID and different cell IDs CID.

Figure 6:
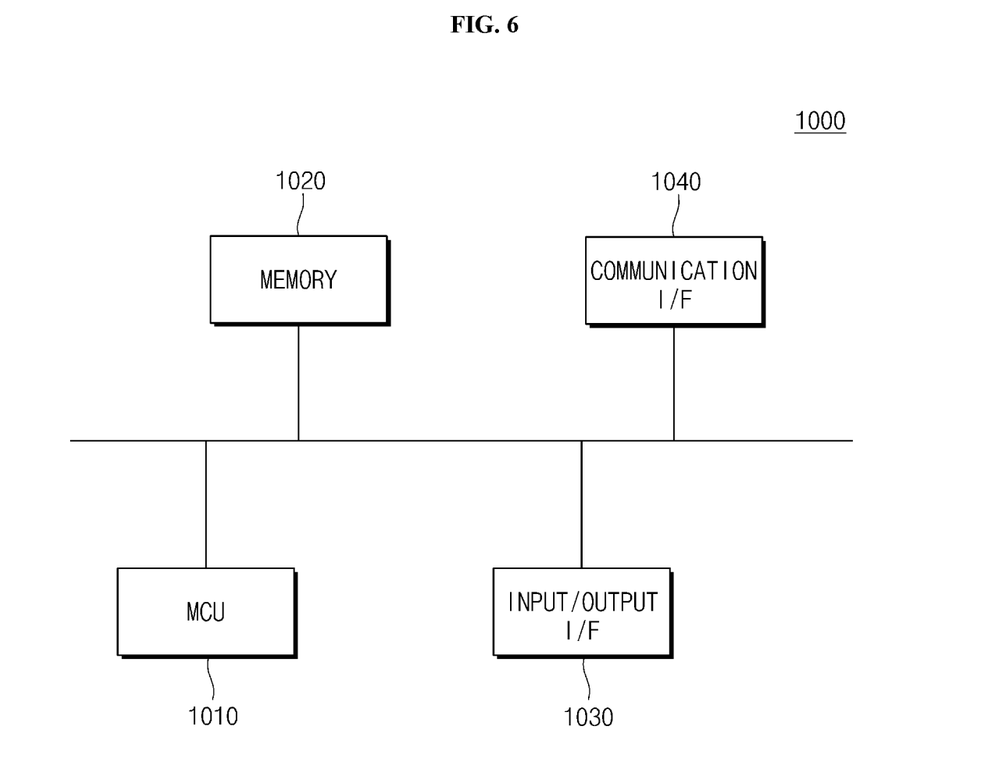
FIG. 6 is a block diagram illustrating a hardware configuration of a computing system for performing a method of operating a battery manufacturing system according to an embodiment disclosed in the present disclosure.

FIG. 6 is a block diagram illustrating a hardware configuration of a computing system for performing a method of operating a battery manufacturing system according to an embodiment disclosed in the present disclosure.

Referring to FIG. 6, a computing system 1000 according to an embodiment disclosed in the present disclosure may include a micro-controller unit (MCU) 1010, a memory 1020, an input/output interface (I/F) 1030, and a communication I/F 1040.

According to an embodiment, the computing system 1000 may be the battery manufacturing system 100 described above or a system for performing an operation of the process controller 200 (hereinafter referred to as a "corresponding device").

The MCU 1010 may be a processor that executes various types of programs stored in the memory 1020.

For example, the MCU 1010 may be a processor that processes various types of data and/or signals required to perform the operation of the process controller 200.

The memory 1020 may store various types of programs and/or data required to manage and control the corresponding device. A plurality of memories 1020 may be provided as necessary.

The memory 1020 may be a volatile memory or a nonvolatile memory. A random access memory (RAM), a dynamic RAM (DRAM), a static RAM (SRAM), or the like may be used as the memory 1020 when the memory 1020 is the volatile memory. A read-only memory (ROM), a programmable ROM (PROM), an electrically alterable ROM (EAROM), an erasable programmable ROM (EPROM), an electrically erasable and programmable ROM (EEPROM), a flash memory, or the like may be used as the memory 1020 when the memory 1020 is the nonvolatile memory. The above examples of the memory 1020 are only examples and embodiments are not limited thereto.

The input/output I/F 1030 may provide an interface for connecting an input device (not shown), such as a keyboard, a mouse or a touch panel, an output device, such as a display (not shown), and the MCU 1010 to transmit and receive data therebetween.

The communication I/F 1040 is configured to transmit and receive various types of data with external components, including a server, and may include various types of devices capable of supporting wired or wireless communication.

As described above, a computer program according to an embodiment disclosed in the present disclosure may be recorded in the memory 100 and performed and processed by the MCU 1010 and thus may be implemented as a module for performing the operations described above with reference to FIGS. 1 to 5.

The above description provides only examples of the technical idea of the embodiments set forth herein, and various changes and modification may be made by those of ordinary skill in the art to which these embodiments pertain without departing from essential characteristics of the embodiments.

Therefore, the embodiments set forth herein are not intended to limit the technical idea described herein but are provided to describe the technical idea, and thus the scope of the technical idea is not limited by the embodiments. The scope of the technical idea described herein should be interpreted based on the following claims, and it should be understood that all technical ideas equivalent thereto fall within the scope of the present disclosure.

What is claimed is:

1. A battery manufacturing method comprising:
    generating, by a process controller, a virtual identifier (ID) corresponding to a battery cell, wherein the process controller is configured to shift the virtual ID across performance of battery processing operations which comprises first to $n^{th}$ processes and a barcode process, n is a natural number of 2 or greater, included in a battery manufacturing process for the battery cell;
    performing, by battery cell processing equipment, a battery processing operation on the battery cell;
    generating, by the battery cell processing equipment, process data for the battery cell indicating a work result or a test result related to the battery cell;
    associating, by the process controller, the virtual ID with the process data generated for the battery cell;
    physically marking a cell ID on the battery cell when one of the first to $n^{th}$ processes is performed;
    extracting, by a cell ID collector, the cell ID of the battery cell during the barcode process after the first to nth processes are completed;
    generating process information, by the process controller, by matching the process data associated with the virtual ID with the cell ID extracted by the cell ID collector; and
    transmitting, by the process controller, the process information including matched process data and the cell ID to an upper control system for analysis of a quality of the battery cell or cause of a battery cell degradation.

2. The battery manufacturing method of claim 1, further comprising, after the generating of the virtual ID, matching the virtual ID with process step information indicating a current process of the battery manufacturing process being performed for the battery cell.

3. The battery manufacturing method of claim 2, wherein the shifting of the virtual ID comprises changing the process step information matching the virtual ID when the current process being performed for the battery cell is changed.

4. The battery manufacturing method of claim 1, wherein the process data comprises the work result and/or the test result of at least one battery processing operation included in the battery manufacturing process for the battery cell.

5. The battery manufacturing method of claim 1, wherein the extracting of the cell ID for the battery cell comprises reading a cell ID that is in a form of barcode attached to the battery cell.

6. The battery manufacturing method of claim 1, wherein the process data matching the cell ID comprises process data collected in a time-series manner throughout a progression of battery processing operations in the battery manufacturing process for the battery cell.

7. The battery manufacturing method of claim 1, wherein the battery manufacturing process for the battery cell comprises a notching and dryer (NDD) process and/or a lamination process.

8. A battery cell manufactured by the battery manufacturing method of claim 1, wherein the battery cell comprises the virtual ID and the cell ID corresponding to the virtual ID.

9. The battery manufacturing method of claim 1, wherein the process data is stored and associated with the virtual ID during the battery manufacturing process.

10. A battery manufacturing system comprising:
    a process controller stored as program instructions on one or more memory devices which are executed by one or more processing devices, the process controller configured to generate a virtual identifier (ID) corresponding to a battery cell and shift the virtual ID across performance of battery processing operations which comprises first to $n^{th}$ processes and a barcode process, n is a natural number of 2 or greater, included in a battery manufacturing process for the battery cell;
    battery cell processing equipment configured to perform a battery processing operation on the battery cell and to generate process data for the battery cell indicating a work result or a test result related to the battery cell; and
    an upper control system configured to evaluate the battery cell based on process information generated by the processing operations included in the manufacturing process for the battery cell;
    wherein:
    the process controller associates the virtual ID with the process data generated for the battery cell;
    the battery cell is physically marked with a cell ID when one of the first to nth processes is performed;
    the process controller matches the process data associated with the virtual ID with the cell ID after extracting the cell ID during the barcode process after the first to $n^{th}$ processes are completed and generates process information; and
    the process information including matched process data and the cell ID is transmitted to the upper control system for analysis of a quality of the battery cell or cause of a battery cell degradation.

11. The battery manufacturing system of claim 10, wherein, after the virtual ID is generated, the process controller is configured to match the virtual ID with process step information indicating a current process of the battery manufacturing process being performed for the battery cell.

12. The battery manufacturing system of claim 11, wherein the process controller is configured to change the process step information matching the virtual ID when the current process being performed for the battery cell is changed.

13. The battery manufacturing system of claim 10, wherein the process data comprises the work result and/or the test result of at least one battery processing operation included in the battery manufacturing process for the battery cell.

14. The battery manufacturing system of claim 10, wherein the process data matching the cell ID comprises process data collected in a time-series manner throughout a progression of battery processing operations in the battery manufacturing process for the battery cell.

15. The battery manufacturing system of claim 10, wherein the battery manufacturing process for the battery cell comprises a notching and dryer (NDD) process and/or a lamination process.

16. The battery manufacturing system of claim 10, further comprising a communicator configured to transmit the process information to the upper control system.

17. A battery cell manufactured by the battery manufacturing system of claim 10, wherein the battery cell comprises the virtual ID and the cell ID corresponding to the virtual ID.

* * * * *